United States Patent [19]
Zhu

[11] Patent Number: 5,870,146
[45] Date of Patent: Feb. 9, 1999

[54] DEVICE AND METHOD FOR DIGITAL VIDEO TRANSCODING

[75] Inventor: Qin-Fan Zhu, Wilmington, Mass.

[73] Assignee: MultiLink, Incorporated, Andover, Mass.

[21] Appl. No.: 786,070

[22] Filed: Jan. 21, 1997

[51] Int. Cl.[6] .............................. H04N 7/24; H04N 7/32
[52] U.S. Cl. ......................... 178/405; 348/409; 375/240
[58] Field of Search ............................ 348/27, 384, 390, 348/400–403, 405, 409–413, 415, 420, 699; 382/232, 236, 238, 248, 250–251; 375/240, 245; H04N 7/130, 7/137

[56] References Cited

U.S. PATENT DOCUMENTS

| | | | |
|---|---|---|---|
| 4,411,001 | 10/1983 | Van Buul et al. | 375/30 |
| 4,972,260 | 11/1990 | Fujikawa et al. | 358/136 |
| 5,072,295 | 12/1991 | Murakami et al. | 358/136 |
| 5,202,685 | 4/1993 | Nagata | 341/76 |
| 5,204,677 | 4/1993 | Akagiri et al. | 341/118 |
| 5,283,814 | 2/1994 | Iwahashi et al. | 375/27 |
| 5,333,012 | 7/1994 | Singhal et al. | 348/405 |
| 5,349,383 | 9/1994 | Parke et al. | 348/397 |
| 5,355,378 | 10/1994 | Ohta | 371/53 |
| 5,412,431 | 5/1995 | Vogel | 348/405 |
| 5,517,142 | 5/1996 | Hamilton | 348/405 |
| 5,537,440 | 7/1996 | Eyuboglu et al. | 375/245 |
| 5,541,852 | 7/1996 | Eyuboglu et al. | 395/200.62 |
| 5,544,266 | 8/1996 | Koppelmans et al. | 382/238 |
| 5,623,312 | 4/1997 | Yan et al. | 348/416 |
| 5,687,095 | 11/1997 | Haskell et al. | 348/394 |

FOREIGN PATENT DOCUMENTS

| | | |
|---|---|---|
| 0 651 574 | 5/1995 | European Pat. Off. . |
| 0 719 055 | 6/1996 | European Pat. Off. . |
| 23536 | 10/1994 | WIPO . |
| WO 95/19072 | 7/1995 | WIPO . |

OTHER PUBLICATIONS

VBR Transport of CBR–encoded video over ATM Networks, Mei Yong et al., D18.1–D18.3, 1994.

Reduction of the Bit Rate of Compressed Video while in its Coded Form, Morrison et al., D17.1–D17.4, 1994.

Line Transmission of Non–Telephone Signals. ITU–T H.261, Mar. 1993.

*Primary Examiner*—Richard Lee
*Assistant Examiner*—Nhon T. Diep
*Attorney, Agent, or Firm*—Lahive & Cockfield, LLP

[57] ABSTRACT

A transcoding method and apparatus having an input former, a requantizer, a buffer, a prediction processor, and a composite switch. The transcoder has multiple feedback paths routed through the composite switch that are selected depending upon system requirements. The input former can further include an inverse quantizer, a summer, and a selector. The selector connects different signal paths in the transcoder depending upon the coding mode of the input bitstream. The buffer can include a frame buffer, a QP buffer, and a comparator for generating a control signal. Further features of the transcoding method and apparatus include a frequency weighted thresholder and a computation resource manager.

37 Claims, 11 Drawing Sheets

5,870,146

DEVICE AND METHOD FOR DIGITAL VIDEO TRANSCODING

BACKGROUND OF THE INVENTION

This invention relates to transcoders, and particularly to digital video transcoders for real time conversion between a first and a second coding scheme.

Due to the fast advances in digital technology and VLSI (very large scale integration) technology and the acceptance of international standards, digital video now finds applications in many areas. For example, multimedia, videoconferencing and videotelephony applications all utilize digital video. In each of these applications, occasions exist where data representing moving picture television or sound must be transmitted over long distances via a transmission link. Transmitting the data in digital form, however, requires high bandwidth communication channels and is expensive. To overcome these disadvantages, various techniques have been designed to compress the digitized video data and to reduce the bit rate required to transmit the coded video signals.

Video compression techniques reduce the amount of data being transmitted by allowing for an acceptable degree of degradation in picture quality. Possible correlations that can be exploited to compress the digital data include the spatial correlations among neighboring pixels in an image and the temporal correlation between successive images. For instance, transform techniques reduce the amount of information needed to code a particular frame by removing the statistical redundancy among neighboring samples using prediction methods. One known form of data compression employs predictive coders where an original sample is predicted based upon past samples and a prediction error (the difference between the original and the predicted samples). Predictive coders can be used for speech, image, or video compression.

The state-of-the-art for video compression is the hybrid coding method where predictive encoding is used in reducing temporal redundancy and transform coding is used in eliminating spatial correlation. The ITU-T, H.261 and H.263 recommendations employ this hybrid coding technique to achieve data compression. The H.261 and H.263 guidelines suggest utilizing motion-compensated prediction for temporal prediction, and discrete cosine transforms (DCT) for spatial domain processing. The coded data stream can be reconstituted into a series of video signals by a compatible decoder which decompresses the coded data stream.

FIG. 1 illustrates a block diagram of a hybrid video encoder 10. According to the ITU-T recommendations, the video input and output consists of individual frames coded in either Common Intermediate Format (hereinafter "CIF") or Quarter Common Intermediate Format (hereinafter "QCIF"). Each frame of the video signal has one luminance component (Y) and two chrominance components (Cb and Cr). Typically, the chrominance components have only half of the resolution of the their luminance counterpart. For example, for a CIF video, the Y component has 288 lines of 352 pixels while the Cb and Cr only have 144 lines of 176 pixels.

To encode a video frame, the frame is first segmented into non-overlapping square blocks. Each of the non-overlapping square blocks is called a macroblock (hereinafter "MB"), and the size of the macroblocks is N×N for luminance components and is (N/2)×(N/2) for chrominance components, where N is a predetermined integer. A typical value for N is 16.

The encoder of FIG. 1 shows that each MB can be coded either in the intra mode or in the inter mode. In the so-called intra mode, the input MB is directly fed to the transformer by a switch S1. Intra mode coding is selected to aid in combating transmission error propagation resulting from predictive systems or when there is no similar part in the previous video frame for prediction. Inter mode coding is normally selected to provide for data compression using predictive coding.

When the encoder codes the input video in the inter mode, the encoder searches for a N×N block of data in the previously decoded frame that minimizes a predetermined error function. This N×N block of data, called the prediction macroblock, is retrieved from a frame buffer by a motion compensator. The encoder then forms a prediction error macroblock by finding the difference between the input MB and the prediction MB at a summer. A transformer then transforms the prediction error macroblock output by the summer. The output of the transformer is then quantized by a quantizer. Typically, an entropy coder completes the encoding of the video data, and an output buffer smoothes out the variation in bit generation to achieve the desired bitrate for the output channel. An inverse quantizer is also coupled with the output of the quantizer. The inverse quantizer and an inverse transformer return the signal to its original format. This allows the outputs of the inverse transformer and the motion compensator to be summed and stored in a frame buffer for coding of the next frame.

Further aspects of inter mode coding provide for skipped Macroblocks. Skipped, or non-coded, Macroblocks are formed when the prediction error is so small that after quantization, all the coefficients are quantized to zeroes and the motion vectors associated with the MB are zero. In H.261 format, the skipped MBs can be coded by differentially coding the macroblock address (MBA). For example, if an MBA of 3 is received for the current non-skipped MB is received, then it suggests that the previous 2 MB are skipped. In H.263, 1 bit is used to signal if the current MB is coded or not. If it is 1, then the current MB is skipped. If it's 0, then the current MB is non-skipped (or coded).

FIG. 2 illustrates a block diagram schematic of a decoder 20 known in the art. It may be viewed as a subset of the corresponding encoder shown in FIG. 1. An input buffer of the decoder buffers the incoming binary bit stream, and an entropy decoder decodes the coding mode, motion vectors and transform coefficients in the incoming bit stream. An inverse quantizer then inverse quantizes the transform coefficients, and an inverse transformer transforms the quantized coefficients. With the aid and direction of the decoded mode information and motion vector, a prediction loop generates an output video signal from the output of the inverse transformer. The prediction loop includes a summer that adds the output of the inverse transformer and the motion compensator to generate the output video signal, a frame buffer for storing and retrieving the output video signal, and a motion compensator for adjusting the signal from the frame buffer according to the motion vector.

When an encoder-decoder pair are attached to the ends of the same communication channel, such as a network, the encode and decode system accurately transmits the digital data over the communication channel. However, in real applications, there are many situations where the two terminals are attached to different communication channels. Communication channels may have different operating rates or characteristics that complicate the encoding and decoding of the digital data. For example, FIG. 3 illustrate a communication system having a first video terminal connected to network 1 and operating at rate 1, and a second video terminal connected to network 2 and operating at rate 2. A bridge device, having a transcoder, must be used to allow terminal 1 to talk to terminal 2. The bridge device performs both network protocol conversion and video transcoding. Such a bridge device is commonly referred to as a multipoint control unit (MCU) if more than two terminals are involved in a conference.

Transcoders convert the incoming rate of the bit stream into a rate acceptable to the decoding or output end of the bit stream. Transcoders can be used to change the rate of a digital video bit stream in a network, or to convert one video compression format to another. Additionally, transcoders can convert a constant bit rate stream into a variable bit rate stream to save bandwidth through statistical multiplexing. Another important application of transcoding involves multipoint videoconferencing where transcoders mix video signals together for continuous presence teleconferencing.

FIG. 4 illustrates a transcoder formed by cascading a video decoder with a video encoder. The decoder decodes the input bit stream into pixel data, and the encoder encodes the intermediate video into the output bit stream with the desired algorithm and bitrate. This transcoder introduces processing delay and requires significant implementation complexity.

FIG. 5 is a block diagram of a more efficient video transcoder as disclosed in: (1.) Eyuboglu, U.S. Pat. No. 5,537,440; (2.) M. Yong, Q.-F. Zhu, and V. Eyuboglu, "VBR transport of CBR encoded video over ATM networks," Sixth Int. Workshop on Packet Video, Sept. 1994; and (3.) D. G. Morrison, M. E. Nilsson and M. Ghanbari, "Reduction of the bit-rate of compressed video while in its coded form," Sixth Int. Workshop on Packet Video, Sept. 1994. As shown in FIG. 5, a modified version $S_i$ of the quantinization error vector is subtracted from a received quantized vector $Y_i$ to form a difference vector $E_i'$. The difference vector $E_i'$ is requantized to obtain the transcoded vector $Y_i'$. A quantinization error vector calculator then computes the inverse transformed quantinization error vector $d_i$ equal to $A_i^{-1}[D_i']$, where $D_i'=Y_i'-E_i'$ is the quantinization error vector and $A_i^{-1}$ is an inverse transformation. A modifying circuitry determines the modified quantinization error vector $S_i$ based on the past vectors $d_i'$. The modifying circuitry can include a transformer, a motion compensator, and a frame buffer. The frame buffer stores past values of the vectors $d_i'$.

The approach illustrated in FIG. 5, however, does not fully account for the processing of skipped macroblocks. This transcoder can allow noise introduced during the transcoding of past frames to remain in the image signal of a skipped macroblock. This effect creates low quality image signals that represent the background in a video signal. Additionally, the transcoder shown in FIG. 5 fails to provide for a feedback path that does not require motion compensation.

Accordingly, it is an object of the invention to provide for a more efficient and cost effective transcoder.

A particular object of the invention is to effectively provide for the processing of skipped macroblocks.

Another object of the invention is to provide a transcoder having a plurality of feedback paths.

These and other objects of the invention are evident in the following description.

SUMMARY OF THE INVENTION

The invention achieves the foregoing objects with a transcoding method and apparatus having an input former that generates a corrected signal based upon an input bitstream of digitized data and a feedback signal, and a requantizer that quantizes the corrected signal to form an output signal having the desired quantinization level. The requantizer also generates an error signal representative of the quantinization error in the output signal. The novel transcoder further includes a buffer for storing and retrieving the quantinization error signal generated by the requantizer, and a prediction processor for generating a prediction signal based upon a delayed quantinization error signal received from the buffer. A composite switch generates and forwards to the input former the feedback signal. The composite switch generates the feedback signal by selecting between the delayed quantinization error signal and the prediction signal. Unlike prior art systems, this transcoder provides for selectable feedback paths, each path being capable of generating a feedback signal. Shorter and less computationally intensive feedback paths rapidly form substantially noiseless feedback signals, while longer and more computationally expensive feedback paths can be utilized when needed to process more complicated image signals.

One aspect of the invention provides for an input former having a selector that modifies the corrected signal based upon the coding mode of the input bitstream.

The selector connects different signal paths depending upon whether the input bitstream is coded as an intra mode, inter mode, or skipped block signal.

Other features of the invention include a buffer having a frame buffer, a QP buffer, and a comparator. The frame buffer stores and retrieves the quantinization error signal generated by the requantizer. The QP buffer and the comparator provide additional control signals to the transcoder for the processing of data encoded in the skipped block mode. In particular, the comparator generates a control signal based upon the current quantinization step size utilized by the requantizer and a past step size stored in the QP buffer.

In accordance with further aspects of the invention, the composite switch can include a first switch and a second switch. The first switch selectively determines an input signal to the composite switch, and the second switch selectively determines an output signal from the composite switch.

Another aspect of the invention includes a frequency weighted thresholder operably coupled with the input former. The frequency weighted thresholder generates a frequency weighted corrected signal by applying frequency dependent threshold limits to the corrected signal. The corrected signal formed generates a video image more suited to the particulars of human vision. An additional feature of the invention is a computation resource manager. The resource manager monitors the computational usage status of the transcoder and controls the computational usage of the transcoder in response to the monitored usage.

DETAILED DESCRIPTION OF THE INVENTION

Figure 1:
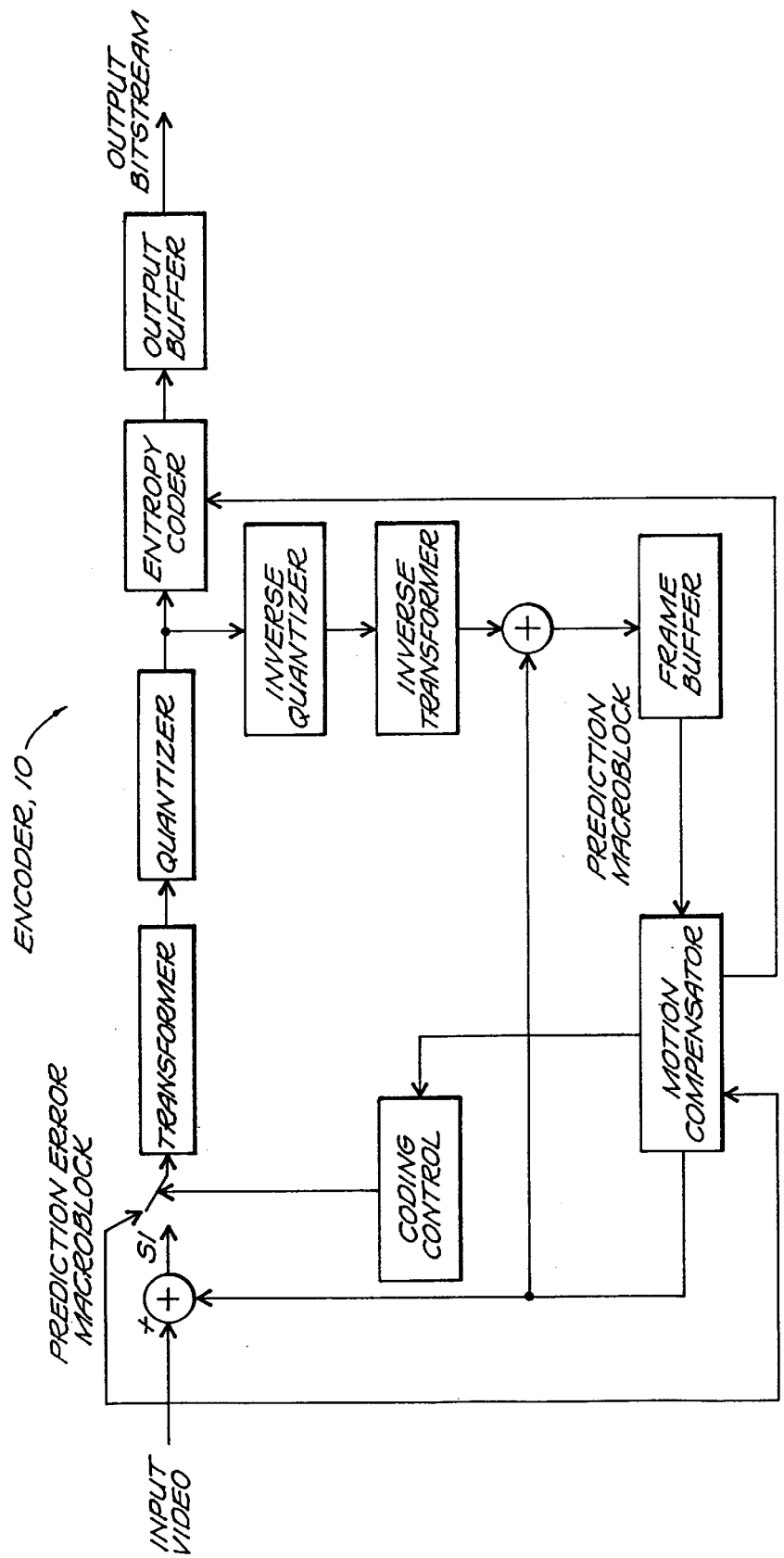
FIG. 1 is a block diagram schematic of a prior art hybrid video encoder.
Figure 2:
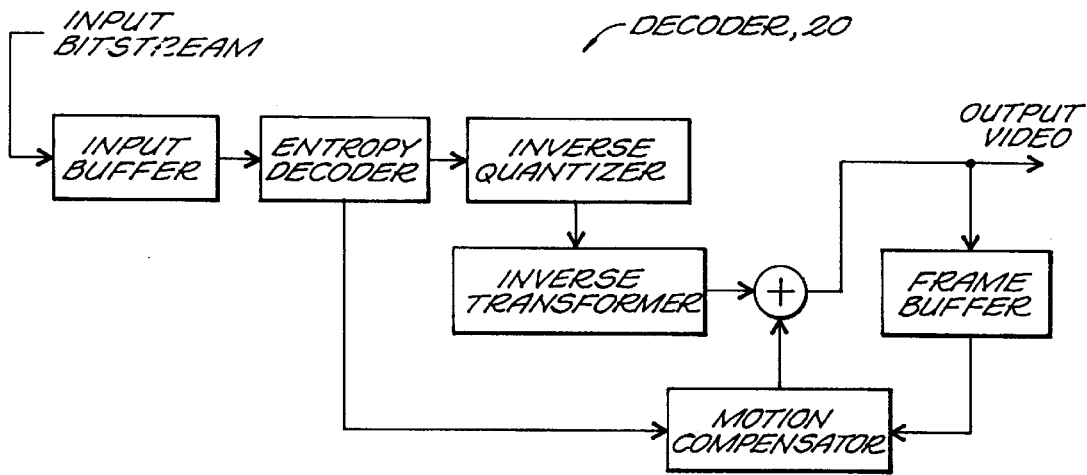
FIG. 2 is a block diagram schematic of a prior art hybrid video decoder.
Figure 3:
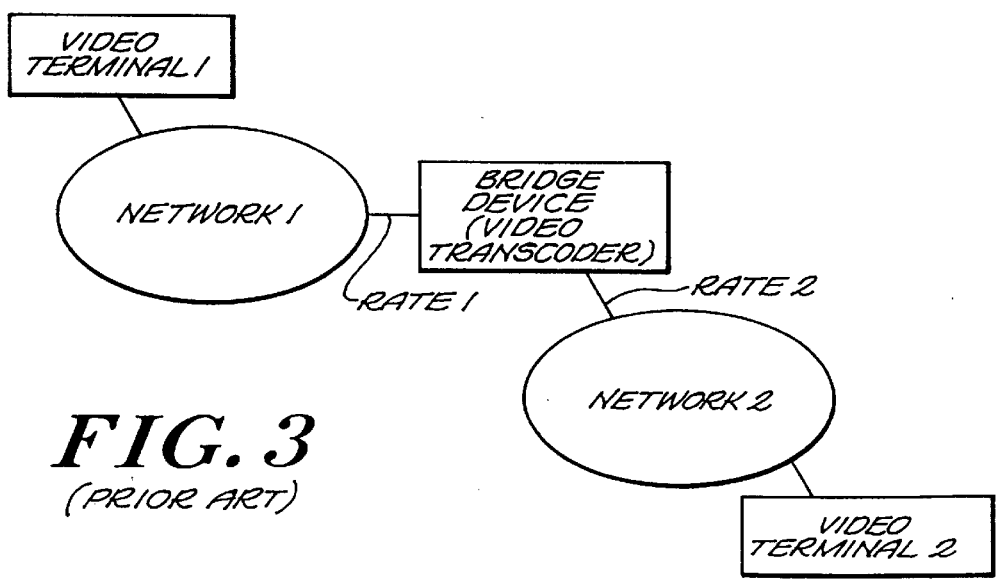
FIG. 3 illustrates two prior art video networks connected through a bridging device having a transcoder.
Figure 4:
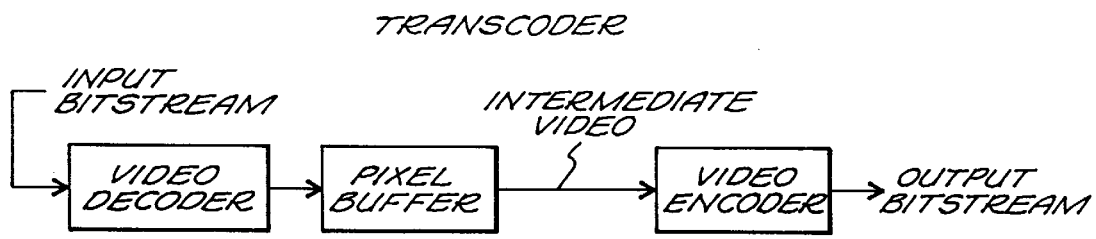
FIG. 4 shows a block diagram of a known prior art transcoder.
Figure 5:
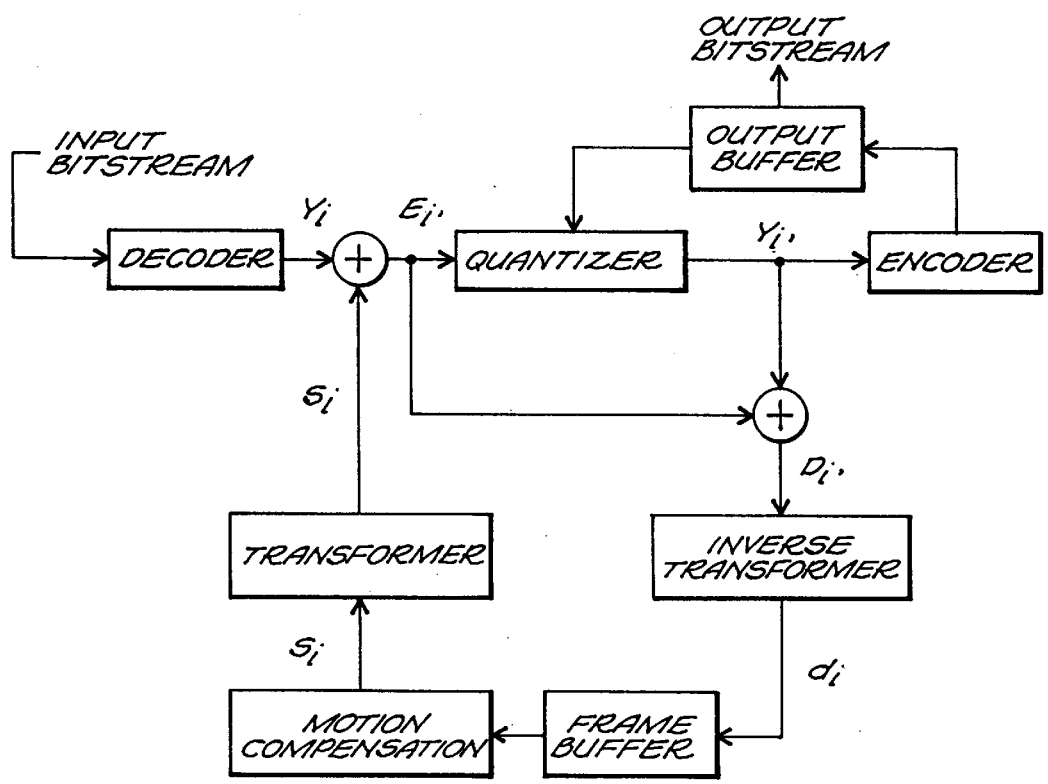
FIG. 5 shows a block diagram of another prior art transcoder.
Figure 6:
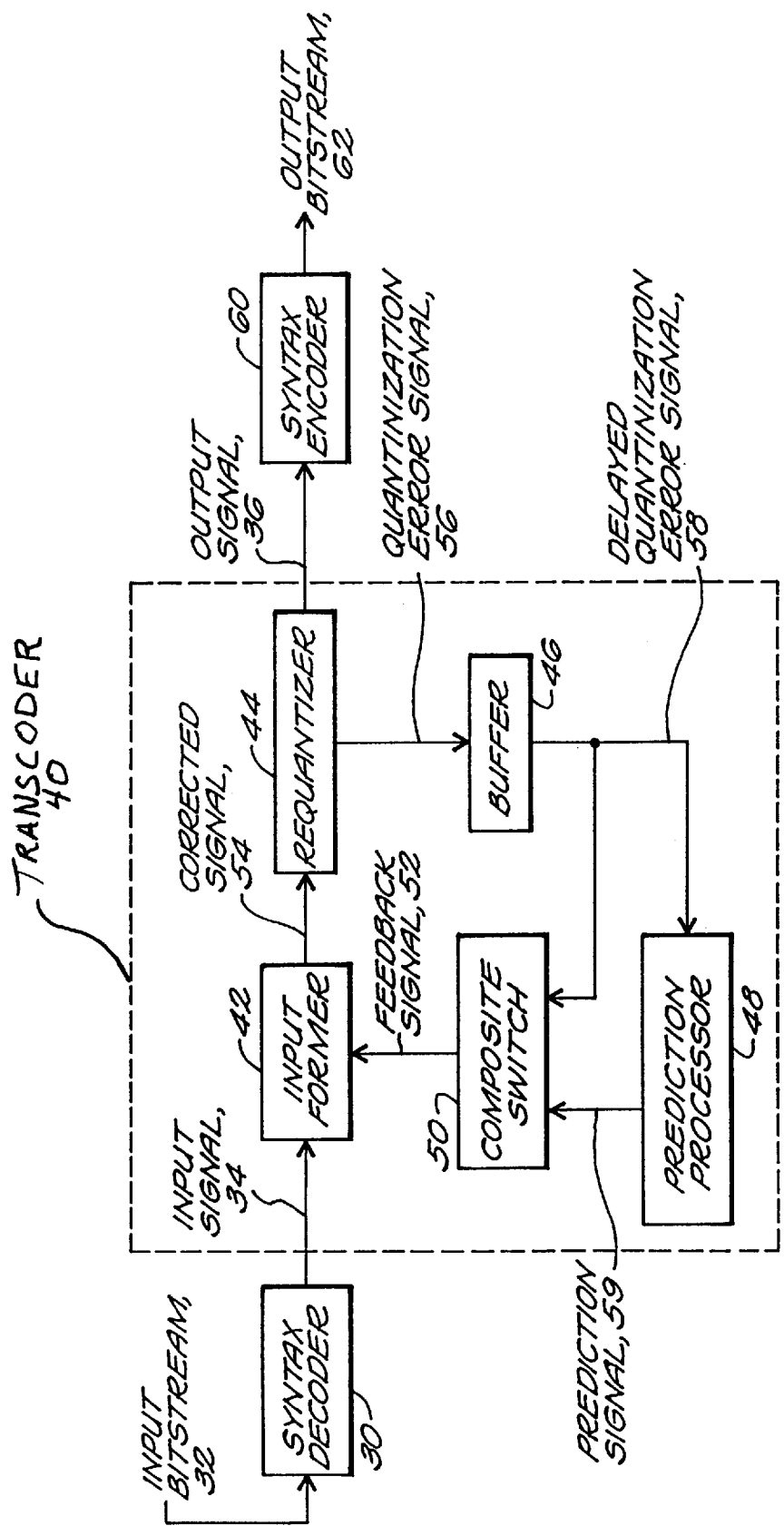
FIG. 6 is a block diagram of a transcoder in accordance with the present invention.

FIG. 6 illustrates a transcoding system having a syntax decoder 30, a transcoder 40 according to the invention, and a syntax encoder 60. The transcoding system can be incorporated into a communication system so that the transcoder 40 acts as a bridge between two networks. The syntax decoder 30 receives an input bit stream 32 from one network, and generates an input signal 34 that is fed to the transcoder 40. When operating within the confines of the H.261 standards, the input signal 34 generated by the syntax decoder 30 is macroblock data and side information from the input bit stream 32 pertaining to framing, inter/intra mode, step size, and motion vectors. The syntax encoder 60 receives an output signal 36 from the transcoder 40 and generates an output bit stream 62 in response thereto.

The transcoder 40 includes an input former 42, a requantizer 44, a buffer 46, a prediction processor 48, and a composite switch 50. The input former 42 receives the input signal 34 from the syntax decoder 30 and a feedback signal 52 from the composite switch 50. The input former 42 generates a corrected signal 54 in response to the received input signal 34 and feedback signal 52. The requantizer 44 quantizes the corrected signal 54 and generates a quantized output signal 36 and a quantization error signal 56. The buffer receives the quantization error signal 56 and generates a delayed quantization error signal 58. The delayed quantization error signal 58 is routed both to the prediction processor 48 and to the composite switch 50. The composite switch 50 receives a prediction signal 59 from the prediction processor and a delayed quantization error signal 58 from the buffer. The composite switch 50 generates the feedback signal 52 by selecting between the delayed quantization error signal 58 and the prediction signal 59.

The transcoder 40 shown in FIG. 6 advantageously includes two quantization error feedback paths that lead from the requantizer 44 and proceed through the buffer 46 to the input former 42. The shorter feedback path proceeds directly from the buffer 46 to the composite switch 50. This shorter feedback path occurs when the composite switch 50 creates a feedback path that leads from the buffer 46 directly to the input former 42. The longer feedback path proceeds from the buffer 46, through the prediction processor 48, to the composite switch 50. This longer feedback path is created when the composite switch 50 forms a feedback path that proceeds from the prediction processor 48 to the input former 42.

The shorter feedback path generates a feedback signal that is frequently more accurate than a feedback signal generated by the longer feedback path. The longer feedback path through the prediction processor 48 creates additional distortions in the feedback signal 52 because of the additional processing of the delayed quantization error signal 58 that occurs in the prediction processor 48. The prediction signal 59 is frequently a less accurate representation of the quantization noise than the delayed quantization error signal 58, and the prediction signal 59 typically takes longer to generate than the immediate routing action of the delayed quantization error signal 58. However, the longer feedback path proves to be effective when spatial manipulation or spatial filtering of the feedback signal 52 is necessary. For instance, the longer feedback path proves particularly effective when the signal must undergo motion compensation. Accordingly, the invention provides for a selectable feedback path for generating the feedback signal 52.

In operation, the transcoder 40 of FIG. 6 accepts a binary digital videostream generated by a remote encoder according to a predetermined syntax. The transcoder 40 also outputs a binary digital videostream having a bit rate that may differ from the rate of the original input bit stream 32. The output bit stream 62 can be formed having the same syntax as the original input bit stream 32 or it can be formed having a different syntax than the original input bit stream 32.

The syntax decoder 30 performs a partial decoding of the input bit stream 32 and thereby generates a set of signals, including: coding mode signals, motion vectors, and transform coefficients. The input former 42 receives the transform coefficients from the syntax decoder 30 and a feedback signal 52 from the composite switch 50. The input former 42 generates, in response to the feedback signal 52 and to the transform coefficients, a corrected signal 54. The corrected signal 54 represents an input signal 34 that has been modified by the feedback signal 52. Typically the feedback signal 52 is a measure of the quantization error introduced by the requantizer 44, and accordingly the corrected signal 54 is updated to counteract the noise introduced by the requantizer 44.

The requantizer 44 quantizes the output of the input former 42, i.e. the corrected signal 54, to generate a quantized output signal 36 having a bit rate that differs from the bit rate of the input bit stream 32. The requantizer 44 also generates a quantization error signal 56 based upon the difference between the input to the requantizer 44 and the output of the requantizer 44. The syntax encoder 60 receives the quantized output signal 36 from the requantizer 44 and encodes the output of the requantizer 44, together with the motion vectors, to generate the output bit stream 62 according to a predetermined syntax. Typically, the syntax is the same as that of the input bit stream 32.

The buffer 46 receives the quantization error signal 56 from the requantizer 44. The quantization error signal 56 is a measure of the error introduced to the corrected signal 54 during quantization of the corrected signal 54. The buffer 46 generates a delayed quantization error signal 58 that represents a prediction of the quantization noise for the next input signal 34. Generally, the delayed quantization error signal 58 is based upon past values of the quantization error signal 56.

The prediction processor 48 receives the delayed quantization error signal 58 from the buffer. The prediction processor 48 then generates a prediction signal 59 in response to the delayed quantization error signal 58. The prediction processor 48 modifies the delayed quantinization error signal 58 in the spatial domain, while typically the delayed quantinization error signal 58 is located in another domain, such as the frequency domain. The prediction processor 48 operates within the spatial domain because certain aspects of the delayed quantinization error signal 58 may be more easily manipulated in the spatial domain. After the prediction processor 48 has modified the delayed quantinization error signal 58 within the spatial domain, the prediction processor 48 transforms the modified delayed quantinization error signal 58 back to its original domain and outputs the signal as the prediction signal 59.

The composite switch 50 receives the delayed quantinization error signal 58 from the buffer 46 and the prediction signal 59 from the prediction processor 48. The output of the composite switch 50 is coupled with the input former 42 and is designated as a feedback signal 52. The composite switch 50 is controllable to either create a signal path between the buffer 46 and the input former 42 (i.e. the shorter feedback path), or to create a signal path between the prediction processor 48 and the input former 42 (i.e. the longer feedback path). When the composite switch 50 selects the shorter feedback path the feedback signal 52 depends directly upon the delayed quantinization error signal 58, and when the composite switch 50 selects the longer feedback path the feedback signal 52 depends upon the prediction signal 59.

Figure 7:
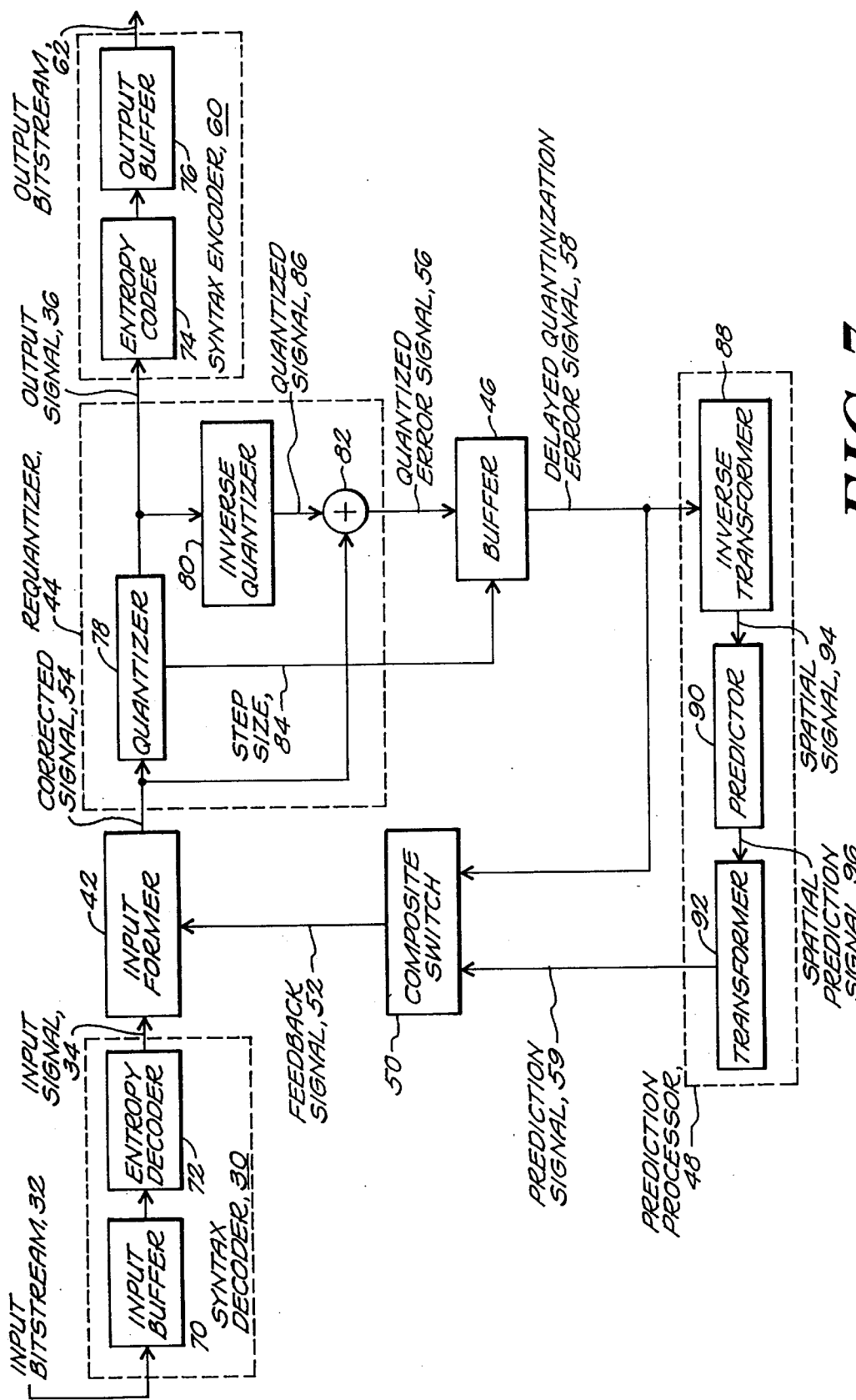
FIG. 7 illustrates a further embodiment of the transcoder shown in FIG. 6 having a detailed diagram of a requantizer and a prediction processor.

FIG. 7 illustrates further aspects of the transcoder 40 in accordance with the invention. In particular, FIG. 7 shows an expanded view of the syntax decoder 30, the syntax encoder 60, the requantizer 44, and the prediction processor 48.

The syntax decoder 30 includes an input buffer 70 and an entropy decoder 72. The input buffer 70 stores and retrieves the input bit stream 32 and the entropy decoder 72 decodes the input bit stream 32 into transform coefficients and side information. The transform coefficients are forwarded to the input former 42. The side information allows the syntax decoder 30 to correctly reconstruct the coded signal. Side information can include the source format (CIF or QCIF), quantizer 78 step size, inter/intra mode decision, and motion vectors. The encoder can also transmit side information to allow the transcoder 40 to skip a macroblock. For example, when all the coefficients in the block are zero and when there is little motion, the macroblock may be identified as a skipped macroblock in the side information.

The syntax encoder 60 includes an entropy coder 74 and an output buffer 76. The output signal 36 of the requantizer 44 is received by the entropy coder 74. The entropy coder 74 re-encodes the output signal from the requantizer 44 and forwards the re-encoded binary bits to the output buffer 76. The output buffer 76 stores the binary bit stream for transmission along a communication channel in the form of an output bit stream 62.

The transcoder 40 of FIG. 7 also includes a detailed block diagram of the requantizer 44. The requantizer 44 includes a quantizer 78, an inverse quantizer 80, and a summer 82. The quantizer 78 receives a corrected signal 54 and generates the output signal 36 in response thereto. Quantizers are known in the art and are used to create a discrete level representation of an input signal in accordance with a quantinization step size. Typically, the quantinization step size can be adjusted with a control signal. As the magnitude of the quantinization step size increases, the fineness of the quantinization decreases, and vice-versa. It is further worth noting that quantizers suffer from error. This error, called quantinization error, is the difference between the input value and the reconstruction value of the input signal.

As shown in FIG. 7, the quantizer 78 is operably coupled to receive the corrected signal 54 from the input former 42. The quantizer 78 quantizes the coefficients in the corrected signal 54 with step size Delta, where the step size is determined as a function of the difference between the bit rate of the input bit stream 32 and the desired bit rate of the output bit stream 62. The step size is further determined as a function of the desired image quality. The step size is determined so as to achieve the desired change in bit rate while improving or retaining image quality. Accordingly, the bit rate of a bit stream can be changed using the transcoder 40 of the present invention.

The current quantinization step is particularly important during the skipped block mode. Data regarding the current quantinization step size aids in determining how to reduce noise in the output signal 36 during the skipped block mode of operation. Accordingly, a step size signal 84, representing the quantinization step size currently being utilized by the quantizer is output by the quantizer. As shown in FIG. 7, the buffer 46 receives the step size signal 84.

The requantizer 44 also includes an inverse quantizer 80 and a summer coupled with the quantizer 78 for generating a quantized error signal 56 representative of the noise added to the corrected signal 54 by the quantinization process. In particular, the inverse quantizer 80 is operably coupled to receive the output signal 36 from the quantizer 78. The inverse quantizer 80 performs the corresponding inverse quantinization with the same step size. The summer is operably coupled to receive the corrected signal 54 and is operably coupled with the inverse quantizer 80 to receive the quantized signal 86. The summer generates a quantized error signal equal to the difference between the corrected signal 54 and the quantized signal 86. The signal produced by the summer represents the quantinization error generated during the quantinization process.

The prediction processor 48 shown in FIG. 7 includes an inverse transformer 88, a predictor 90, and a transformer 92. The inverse transformer 88 receives the delayed quantinization error signal 58 from the buffer 46 and generates a spatial signal 94. The inverse transformer 88 transforms the delayed quantinization error signal 58 to a domain more appropriate for spatial modification. The predictor 90 receives the spatial signal 94 and generates a spatial prediction signal 96 that is output to the transformer 92. The transformer 92 then operates upon the spatial prediction signal 96 with a transform that is the inverse of the inverse transformer 92. That is, the transformer 92 returns the signal back to the domain of the delayed quantinization error signal 58.

The transformer 92 used in the transcoder 40 is preferably a discrete cosine transform (DCT) and the inverse transformer 92 is preferably an inverse discrete cosine transform. The inverse discrete cosine transform is applied independently to each 8×8 block in the macroblock to obtain the transform coefficients as given by:

spatial signal 94 $(x, y) =$ $$\frac{1}{4} \sum_{u=0}^{7} \sum_{v=0}^{7} C(u)C(v)F(u, v)\cos[\pi(2x + 1)u/16]\cos[\pi(2y + 1)v/16]$$

with u,v,x,y=0,1,2, . . . , 7;
where x,y=spatial coordinates in the pel domain;

u,v=coordinates in the transformed domain;

$$C(u) = \frac{1}{\sqrt{2}} \quad ;\text{for } u = 0$$
$$\phantom{C(u) =} 1 \quad ;\text{for all other cases; and}$$
$$C(v) = \frac{1}{\sqrt{2}} \quad ;\text{for } v = 0$$
$$\phantom{C(v) =} 1 \quad ;\text{for all other cases;}$$

$F(u, v)$ = delayed quantinization error signal.

The predictor 90 is preferably a motion compensator. The motion compensator adjusts the spatial signal 94 to account for movement in the image being transmitted. The motion compensator relies upon a motion vector that is extracted from the input bitstream by the entropy decoder 72 to implement motion compensation. Typically a motion vector is generated, in a remote encoder, by an algorithm that searches the pixels in a previously reconstructed image to find a window for which the "distance" between the pixels in that window and the corresponding pixels in the current block is a minimum. The spatial offset between the window and the current block is defined as the motion vector. The motion compensator then uses the motion vector to offset the current image signal to obtain a more accurate data representation of the image.

Figure 8:
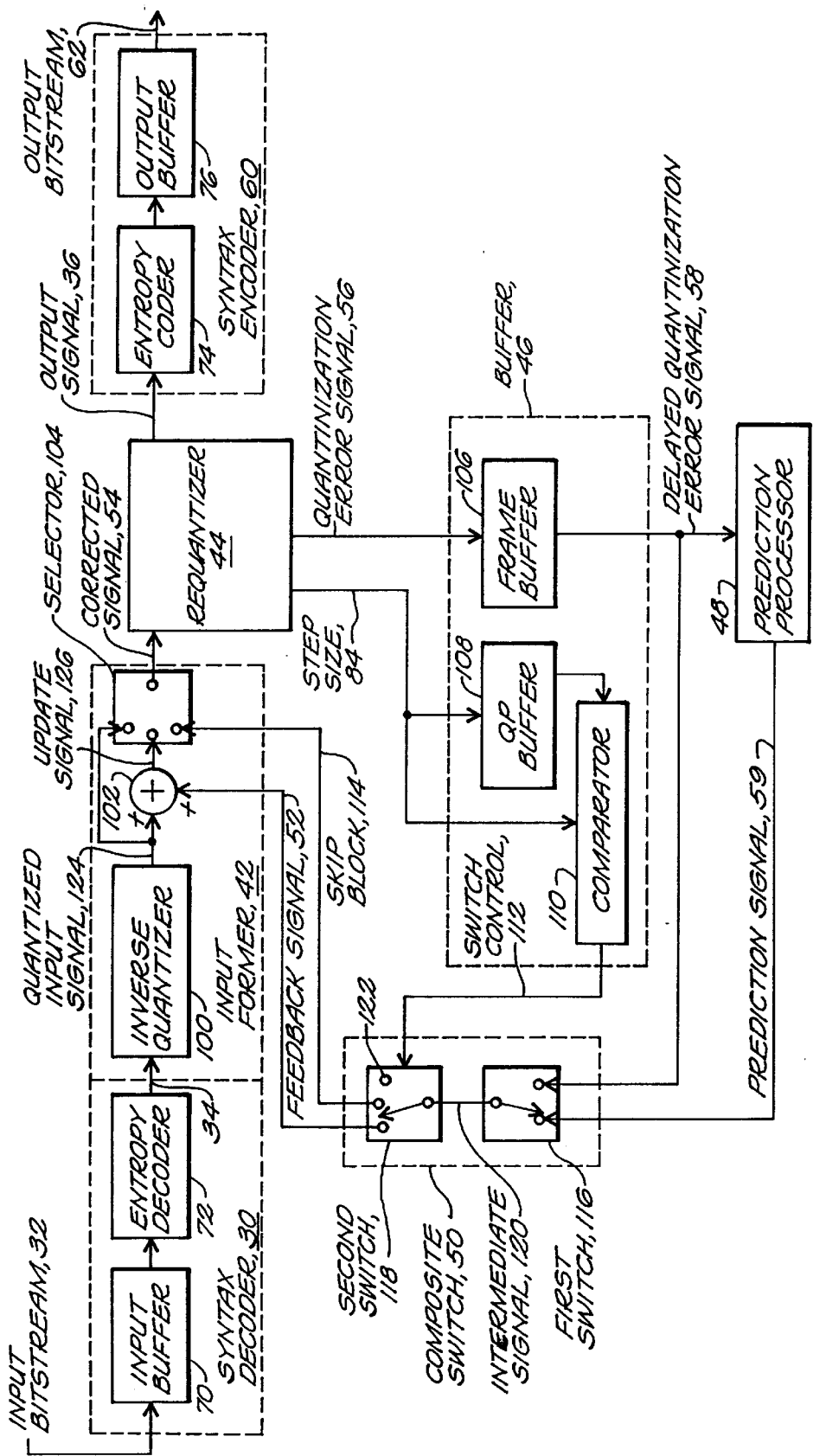
FIG. 8 shows a block diagram of the transcoder of FIG. 6 having a detailed diagram of an input former and of a predictor.

FIG. 8 illustrates further details of the transcoder 40 shown in FIG. 6. The illustrated input former 42 includes an inverse quantizer 100, a summer 102 and a selector 104. In addition, further details of the buffer 46 as shown include a frame buffer 106, a QP buffer 108 and a comparator 110.

The buffer 46 shown in FIG. 8 receives a quantinization error signal 56 and a step size signal 84 from the requantizer 44 and generates a delayed quantinization error signal 58 and a switch control signal 112 as output. The quantinization error signal 56 is routed to the frame buffer 106. The frame buffer 106 generates the delayed quantinization error signal 58 based upon past values of the quantinization error signal 56. For instance, the delayed quantinization error signal 58 generated can be the quantinization error signal 56 during previous frames. In accordance with this embodiment, the coefficient frame buffer 106 can simply be a memory element for storing and retrieving the quantinization error signal 56.

The buffer 46 also includes a QP buffer 108 for receiving the step size signal 84 from the requantizer 44. The QP buffer 108 is typically a memory element large enough for storing and retrieving the step size signal 84 for a video frame. The memory size of the QP buffer 108 is determined by the number of macroblocks in a videoframe multiplied by the space required to store the step size signal 84. For a typical video coding method like H.261 and H.263, five bits is enough to store the step size signal 84 because the step size signal 84 only takes integer values from one to 31. For a QCIF video with frame size of 144×176, we have 99 macroblocks. Therefore, the minimum QP buffer 108 size for this case is 495 bits. However, it should be noted, that in many practical applications one byte (8 bits) is used to store the step size signal 84 in order to save implementation complexity.

The buffer 46 also can include a comparator 110 for comparing the step size signal with the output of the QP buffer 108, i.e. a delayed step size signal. The comparator 110 generates a switch control signal 112 in response to the inputs received from the QP buffer 108 and the requantizer 44 and in response to the current operating mode of the transcoder 40. When the transcoder 40 is not operating in skipped block mode, the control signal 112 directs the composite switch 50 to generate a feedback signal 52. When the transcoder 40 is operating in skipped block mode, the control signal directs the composite switch 50 to generate a skip block signal 114.

During skipped block mode, the comparator 110 compares the current step size signal 84 with the delayed step size signal from the QP buffer 108. If the current step size is less than the delayed step size, then the control signal directs the composite switch 50 to generate a skipped block signal based upon the delayed quantinization error signal 58. If, however, the current step size is more than the delayed step size, then the control signal directs the composite switch 50 to generate a skipped block signal having a null value.

The transcoder 40 shown in FIG. 8 also includes a detailed diagram of the composite switch 50. The composite switch 50 has a first switch 116 and a second switch 118. The first switch 116 controls the selection of an input signal into the composite switch 50 and the second switch 118 controls the selection of an output signal from the composite switch 50. An intermediate signal path 120 connects the first switch 116 and the second switch 118.

The first switch 116 selects an input signal to the switch from either the delayed quantinization error signal 58 or the prediction signal 59. Thus, the intermediate signal is based upon either the delayed quantinization error signal 58 or the prediction signal 59, depending upon the input terminal chosen. The second switch 118 selects an output signal from either the feedback signal 52, the skip block signal 114, or a null terminal 122. The intermediate signal is routed to either the feedback signal 52, the skip block signal 114, or the null position, depending upon the output terminal chosen.

The switch control signal 112 from the buffer 46 control the selection of the output terminal in the second switch 118. If the transcoder 40 is not operating in skipped block mode, then the intermediate signal is connected with the feedback signal 52. If the transcoder 40 is operating in skipped block mode, then the intermediate signal is connected with either the skip block signal 114 or the null terminal 122. Accordingly, when operating in skip block mode, the intermediate signal can be connected to the skip block signal, thereby forming a corrected signal 54 substantially equivalent to the intermediate signal. Alternatively, when operating in skip block mode, the intermediate signal can be connected with the null terminal 122, thereby forming a corrected signal 54 having a null value.

FIG. 8 also details elements forming the input former 42. The input former 42 includes an inverse quantizer 100, a summer 102 and a selector 104. The inverse quantizer 100 receives an input signal 34 from the syntax decoder 30 and generates a quantized input signal 124. The summer receives the quantized input signal 124 from the inverse quantizer 100 and a feedback signal 52 from the composite switch 50. The summer 102 generates an update signal 126 equal to the sum of the input signals it receives. The selector 104 receives the quantized input signal 124, the update signal 126, and the skip block signal 114 and selects one of the three received signals to be the corrected signal 54.

The selector 104 provides different paths for generating the corrected signal 54 to account for various modes of coding the image in the input bit stream 32. The coding modes include intra mode, inter mode, and skip block mode. For instance, in intra mode coding the input bit stream is based on a single video image, rather than a comparison between frames of the input picture. In this case, the selector 104 forms the corrected signal 54 based solely upon the quantized input signal 124. When the original macroblock is coded in inter mode, the input bit stream is based upon a comparison between video frames. Under these circumstances, the selector 104 must couple the corrected signal 54 with the feedback signal 52. Particularly, in inter mode, the corrected signal 54 is generated by routing the sum of the quantized input signal 124 and the feedback signal 52 through the selector 104. If the original macroblock coded in the input bit stream 32 is coded as a skipped macroblock, then the selector 104 bases the corrected signal 54 upon the skip block signal 114 received from the composite switch 50.

Figure 9:
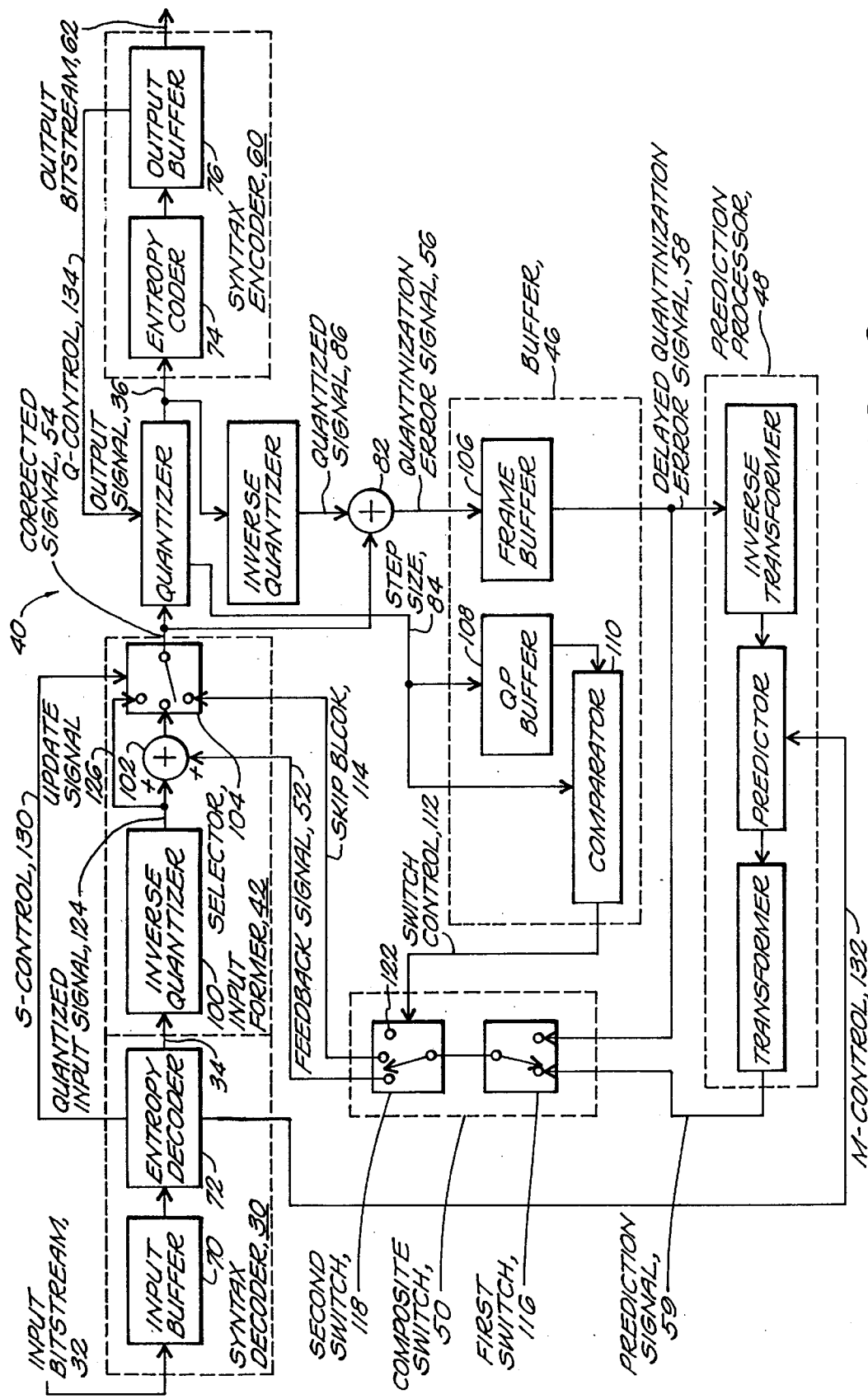
FIG. 9 is a detailed block diagram of the transcoder of FIG. 6.

FIG. 9 is a detailed schematic of the transcoder 40 and various control signals. A S-control signal 130 and a M-control signal 132 are generated when the entropy decoder 72 decodes the side information from the input bit stream 32. A Q-control signal 134 is generated by the output buffer 76 and is input to the quantizer 78.

The Q-control signal 134 is used to control the quantinization step size of the quantizer 78. The Q-control signal 134 varies as a function of the fullness of the output buffer 76 memory. Accordingly, the quantizer 78 is forced to be responsive to the fullness of the output buffer 76. For instance, the quantization step size for a group of data can be determined based upon the quantity of codes stored in the output buffer 76 at the time after the completion of the coding of the preceding group of data. The Q-control signal 134 prevents buffer overflows and underflows by decreasing the quantinization step size. Decreasing the quantinization step size increases the fineness of the quantinization thereby increasing the amount of data in the output signal 36. Similarly, increasing the quantinization step size decreases the fineness of the quantinization thereby decreasing the amount of data in the output signal 36.

The S-control signal 130 is produced at the entropy decoder 72 and is used to control the selector 104. In particular, the S-control signal 130 determines the routing path to form the corrected signal 54. If the signal decoded at the decoder indicates that the macroblock is coded in intra mode, then the S-control signal 130 causes the selector 104 to route quantized input signal 124 through the selector 104. If the macroblock is coded as inter mode, then the S-control signal 130 causes the selector 104 to route the update signal 126 through the selector 104. In addition, if the original macroblock is coded as a skip block, then the S-control signal 130 causes the selector 104 to route the skip block signal 114 through the selector 104.

FIG. 9 also shows an M-control signal 132 that is generated at the decoder stage from the input bit stream 32. The M-control signal 132 directs the operation of the composite switch 50 and the motion compensator depending upon the encoding mode of the video image in the input bit stream 32. If the decoded input bit stream 32 further indicates that only interframe coding is used without motion compensation, then the M-control signal 132 directs the composite switch 50 to connect the path between the delayed quantization error signal 58 and the feedback signal 52. In comparison, if the decoded input bit stream 32 indicates that motion compensation is used, then the M-control signal 132 directs the composite switch 50 to connect the path between the prediction signal 59 and the feedback signal 52.

For relatively low bit rate digital video applications such as videoconferencing and videotelephony, the majority of the macroblocks will be coded without motion compensation. For these macroblocks, the present invention directly fetches their delayed quantinization error signal 58 from the buffer 46 without going through the prediction processor 48. The advantage of this is two-fold: (1) implementation complexity is significantly reduced, and (2) the additional distortion added to the signal by the prediction processor 48 is eliminated. In particular, the delayed quantinization error signal 58 contains less additive noise than the prediction signal 59 and accordingly the delayed quantinization error signal 58 produces a higher quality picture.

Figure 10:
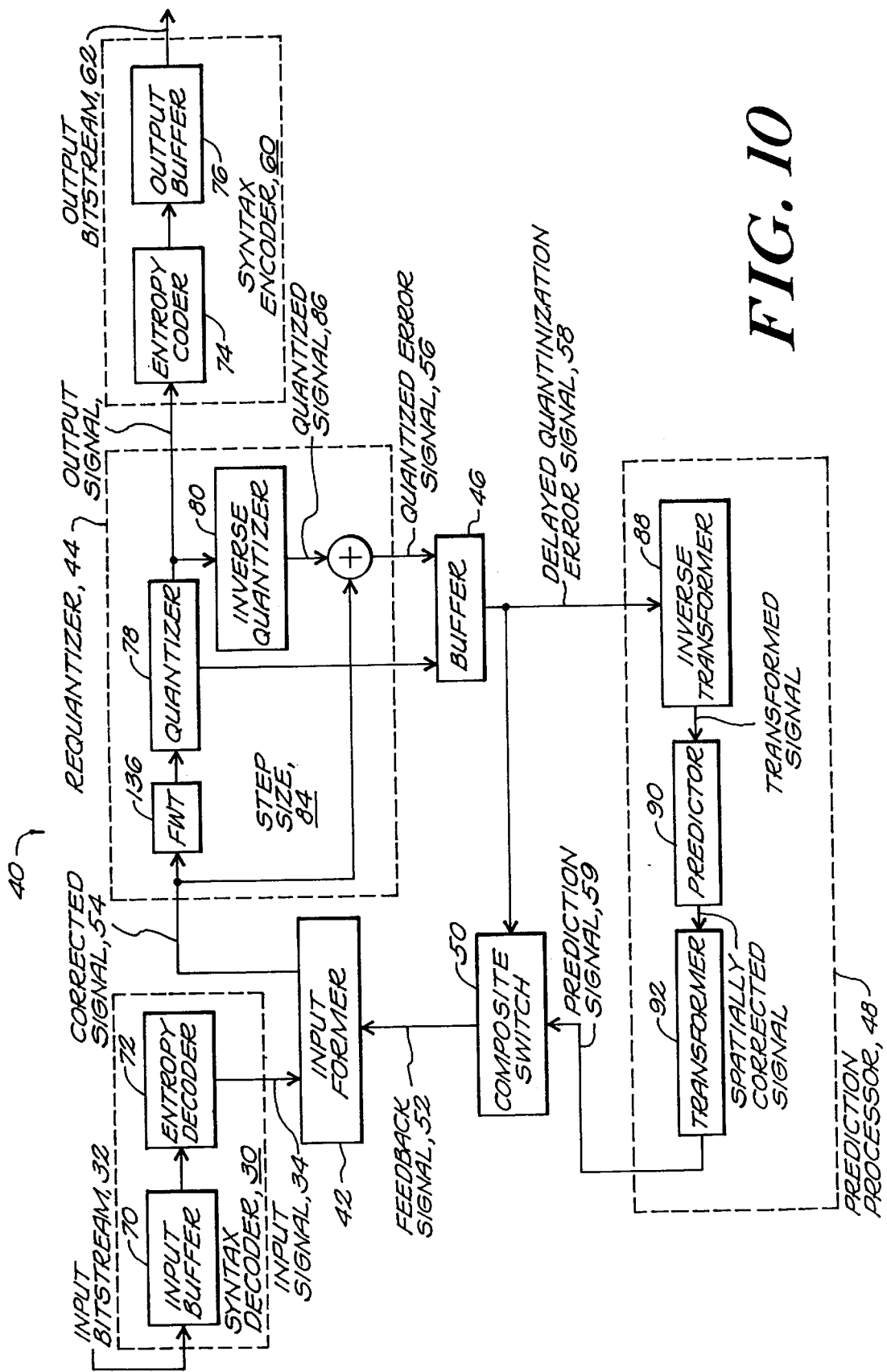
FIG. 10 is a detailed block diagram of the transcoder of FIG. 6 having a frequency weighted thresholder.

FIG. 10 illustrates the transcoder 40 having a frequency weighted thresholder (FWT) 136. The FWT 136 is operably coupled to the input former 42, particularly the FWT 136 receives the corrected signal 54 from the input former 42 and generates a signal that is received by the quantizer 78 in the requantizer 44. The FWT 136 improves the picture quality of the output signal 36 generated by the requantizer 44.

It is well known that human vision systems can tolerate higher distortions for higher frequency components than for low frequency components. However, in most video coding systems, such as H.261 and H.263, all the transform coefficients are treated equally. The FWT 136 takes advantage of the particulars of human vision to improve picture quality by applying different weights to the various frequency coefficients of the video image.

The FWT 136 is a filter that is frequency-dependent. The FWT 136 includes thresholds assigned to various frequency components across the spectrum. The FWT 136 compares the input transform coefficients to the thresholds at a given frequency component. If the input transforms coefficients do not exceed the threshold at the given frequency component, then the transform coefficient is set to zero. If the incoming transform coefficient exceeds the threshold value at the given frequency, then the transform coefficient is left unmodified. The threshold values differ across the range of frequency being viewed by the FWT 136. In particular, the thresholds are higher for higher frequency components than they are for low frequency components.

Figure 11:
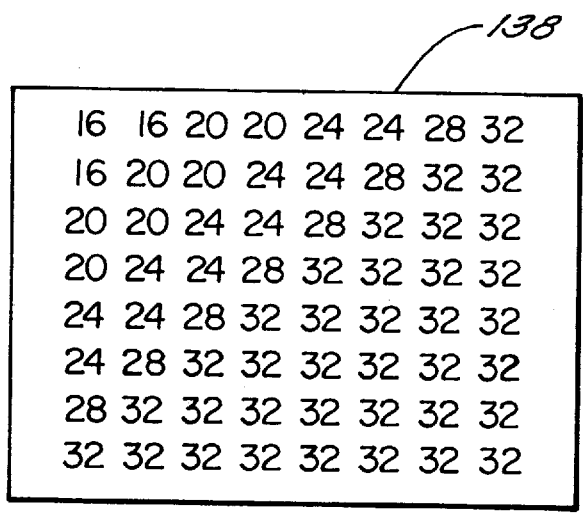
FIG. 11 is an example of a threshold matrix associated with the frequency weighted thresholder of FIG. 10.

FIG. 11 illustrates an example of a threshold matrix 138 forming the FWT 136 shown in FIG. 10. The matrix shown in FIG. 11 is for use with a DCT transform having an 8×8 block size. The real threshold of the FWT 136 are derived as follows:

$$T_{ij} = W_{ij} * QP/8$$

where i=0,1, . . . ,7; and
j=0,1, . . . ,7,

In the above equation i is the row index and j is the column index in the DCT transform domain, $T_{ij}$ is the threshold to be used for coefficients at location (i,j), $W_{ij}$ is the corresponding weighting factor shown in the matrix of FIG. 11, and QP is half of the quantinization step size used for quantizing the current macroblock for data.

Figure 12:
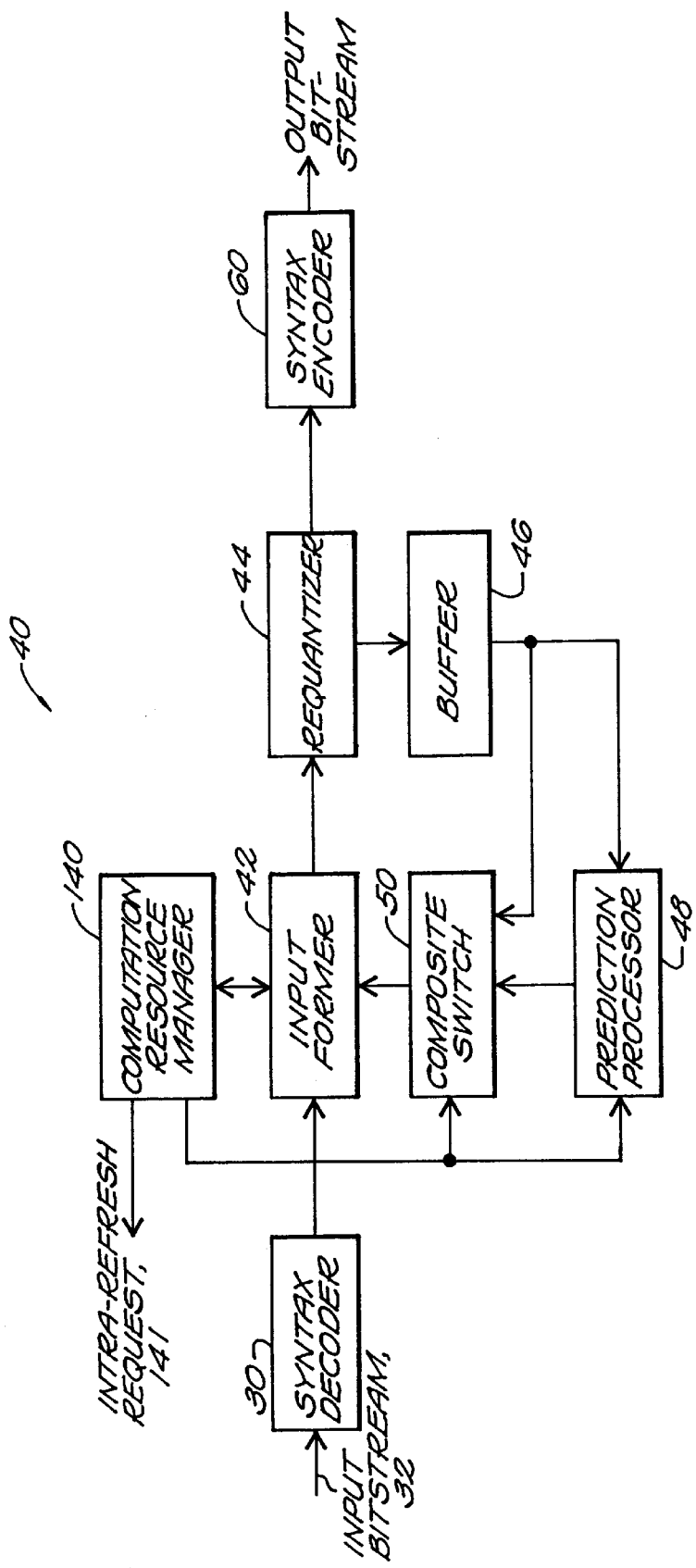
FIG. 12 shows the transcoder of FIG. 6 having a computation resource manager.

FIG. 12 illustrates a further aspect of the invention for increasing the efficiency of the transcoder 40. The transcoder 40 shown includes a computation resource manager 140 operably coupled with the syntax decoder 30 and with the input former 42 for monitoring the system load and for controlling the transcoder 40 in response to the system load. The computation resource manager 140 can also be coupled with the composite switch 50 and the prediction processor 48 for controlling computational usage by the transcoder 40. The computation resource manager is coupled to and directs the operations of the input former, the composite switch, the prediction processor, and the buffer using computational control signals. The computation resource manager proves particularly effective in systems, such as MCUs, where computation resources are precious.

The computation resource manager 140 continuously monitors the system load by monitoring the input buffer 70 fullness. When the input buffer 70 fullness is high, the system typically cannot process the input data fast enough and accordingly the load on the system must be reduced. The computation resource manager 140 can modify the load on the system through various means. The computation resource manager 140 can alter the computation resource usage by directing the actions of either the input former 42, the prediction processor 48, or the composite switch 50.

For instance, the computation resource manager 140 can control the composite switch 50 to stop the processing of skipped macroblocks. Additionally, the computation resource manager 140 can instruct the input former 42 to disable the feedback aspects of the system to reduce the computational usage of the transcoder 40. Particularly, the computation resource manager 140 can force the selector 104 in the input former 42 to form a path between the quantized input signal 124 and the corrected signal 54. This position of the selector 104 reduces the computational requirements of the system because it cuts off the feedback path generated through the feedback signal 52 and the skipped block signal. Moreover, the computation resource manager 140 can instruct the prediction processor 48 to disable all motion compensation in order to reduce the computational usage of the transcoder 40.

The computation resource manager 140 can be implemented with a state variable diagram, where the state variable monitors and stores the sum of data indicative of the system load. When the state variable rises above a particular threshold, the computation resource manager 140 acts to reduce the system threshold. The computation resource manager 140 can continue taking further actions as the state variable rises above additional thresholds. In addition, the computation resource manager 140 can remove those aspects of the system which reduce the computational load as the state variable falls. For instance, when the state variable is high, the input former 42 may only generate the corrected signal 54 based upon the quantized input signal 124 and the motion compensator processor may be deactivated. In comparison, when the state variable falls, the computation resource manager 140 may choose to re-activate the prediction processor 48.

In another aspect of the invention, the computation resource manager 140 can modify the system load by changing the coding mode of the input bitstream 32. The computation resource manager generates an intra refresh request signal 141 that is coupled with a remote encoder. The remote encoder controls the coding mode of the input bitstream and the intra refresh request signal 141 directs the operation of the remote encoder. Particularly, the control signal 141 can direct the remote encoder to encode the input bitstream 32 in either intra mode or inter mode coding. Accordingly, to reduce the system load the computation resource manager can force the remote encoder to encode the input bitstream in intra mode.

When the computation resource manager forces the transcoder to operate in a computationally less intensive status, the produced picture quality may deteriorate. The deterioration can be stopped by intra coding updating at the remote encoder. However, excessive use of intra-coding can also result in lower picture quality. Hence, the intra mode request signal is only sent by the computation resource manager when the noise level exceeds a predetermined threshold and when the load on the computational usage of the system has exceeded another predetermined level. The noise level can be gauged by providing a counter that counts the number of macroblocks whose coding mode is forced to change during transcoding.

Figure 13:
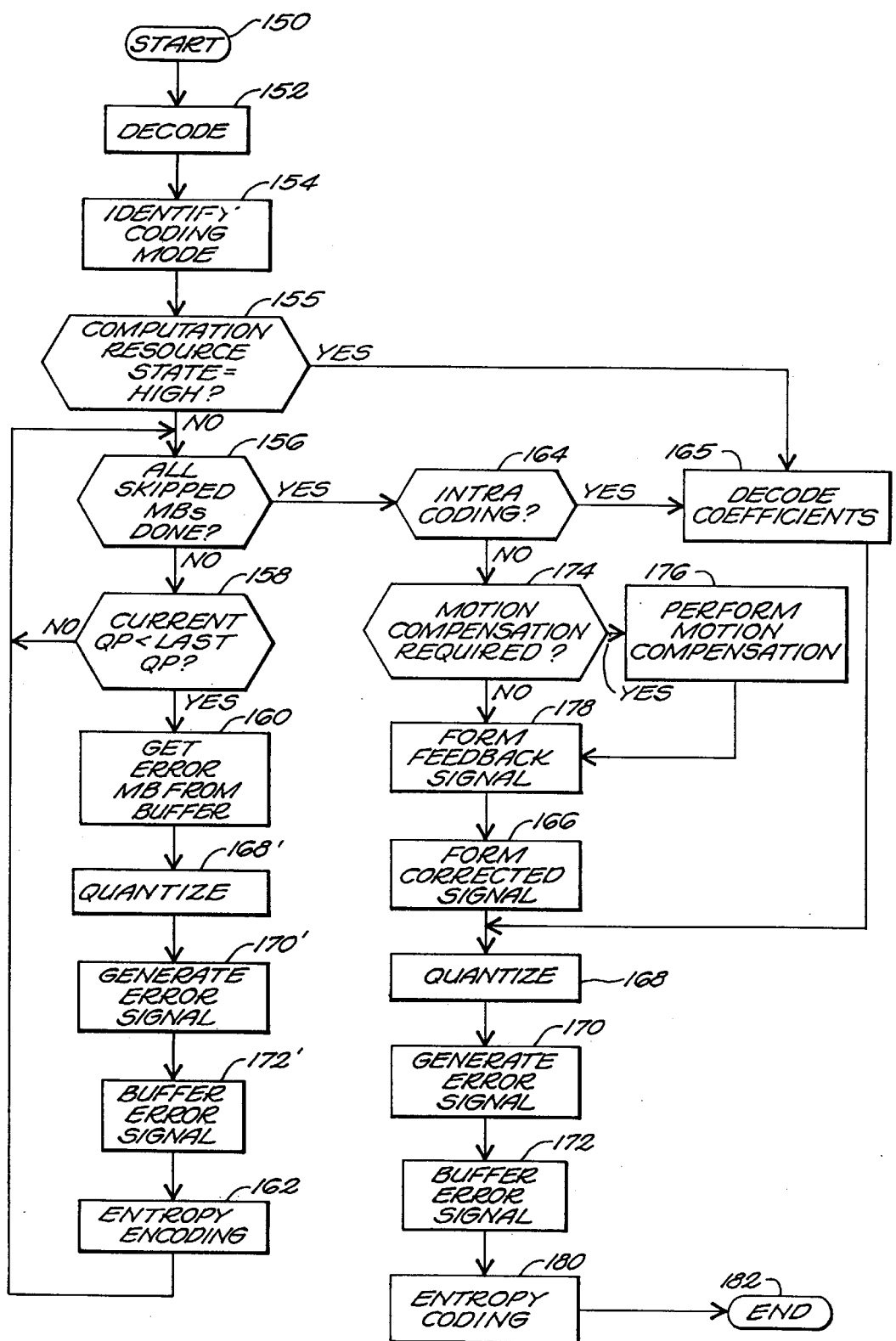
FIG. 13 illustrates a flow chart of the transcoding method in accordance with the present invention.

FIG. 13 illustrates a flow chart for implementing the methods steps of the current invention. The method shown transcodes an input signal coded in either intra, inter, or skip block mode. The illustrated method also efficiently transcodes the input signal by selectively providing for motion compensation of the input signal.

The flow chart starts at step 150. After step 150, logical flow proceeds to step 152. At step 152, the input bitstream is decoded. After decoding, the transcoding system identifies the coding mode of the input bitstream at step 154. The coding mode can be selected from intra, inter, and skip block modes of coding.

At decision box 156, the system identifies whether all skipped blocks are completed. If any skipped blocks need to be processed, then logical control proceeds to decision box 158, otherwise logical control proceeds to decision box 164.

At decision box 158, the transcoding system determines whether the current quantinization step size is less than the previous quantinization step size. If the current step size is less, then control proceeds to action box 160. If the current step size is greater, then control returns to decision box 156.

At action box 160, the transcoding system obtains an error macroblock from the buffer 46. This error macroblock is then applied against the current image signal. After box 160, control proceeds consecutively to actions box 162. At box 162, the transcoding system encodes the output signal 36 using entropy coder 74. Afterwards, logical flow of the transcoding system returns to decision box 156.

At decision box 164, the transcoding system determines whether the coding mode of the input bitstream is intra coding. If the bitstream is not intra coded, i.e. the bitstream is inter coded, then control proceeds to action box 166. If the bitstream is intra coding, the control proceeds to action box 165 where the coefficients are decoded. After box 165, logical flow proceeds to action box 168.

At decision box 174, the transcoding system determines whether the input bitstream requires motion compensation. If motion compensation is required, then control proceeds to action box 176, where motion compensation is performed by the prediction processor 48. If motion compensation is not required, then control proceeds to box 178. At box 178, the feedback signal 52 is selectively formed based on either the delayed quantinization error signal 58 or the prediction signal 59. Logical flow then proceeds to action box 166.

At box 166, the input former 42 forms a corrected signal 54 based upon the input bitstream 32 and a feedback signal 52. Afterwards, at action box 168, the transcoding system quantizes the corrected signal to form an output signal 36. After box 168, logical flow proceeds to action box 170.

At action box 170, the system generates an error signal representing the quantization error of the quantizer used in step 168. After box 170, the system buffers the error signal at step 172. After box 172, flow proceeds to box 180.

At box 180, the entropy coder 74 performs entropy coding on the output signal 36. At box 182, the transcoding system proceeds to the next macroblock of data that requires processing.

The invention being thus disclosed and described in connection with the illustrated embodiments, variations and modifications thereof will occur to those skilled in the art, and are intended to be included within the scope of the invention, as defined by the claims appended hereto.

What is claimed is:

1. A transcoder for transcoding an applied digitally encoded input signal and generating an output signal, comprising:

an input former for generating a corrected signal from said input signal and a feedback signal, a requantizer operably coupled to said input former for quantizing said corrected signal based upon a predetermined quantization step size, and requantizer generating said output signal and a quantization error signal, a buffer operably coupled to said requantizer for receiving said quantization error signal and for generating a delayed quantization error signal, a prediction processor operably coupled with said buffer for generating a prediction signal as a function of said delayed quantization error signal, and a composite switch operably coupled with said input former and either of said buffer and said prediction processor, said composite switch forming said feedback signal by selecting between said delayed quantization error signal and said prediction signal, wherein said prediction processor includes an inverse transformer operably coupled to receive and perform an inverse linearly transform on said delayed quantization error signal, a predictor operably coupled with said inverse transformer for receiving a signal from said inverse transformer and generating a spatial prediction signal, and a transformer operably coupled with said predictor for linearly transforming said spatial prediction signal.

2. A transcoder according to claim 1, wherein said requantizer further comprises:

a quantizer operably coupled to receive said corrected signal from said input former, said quantizer generating said output signal at a new bit rate, an inverse quantizer operably coupled with said quantizer for generating a quantized signal, and an adder operably coupled to receive said quantized signal and said corrected signal, said adder generating said quantinization error signal representative of error introduced by said requantizer.

3. A transcoder according to claim 2, wherein said quantizer generates a step size signal identifying the current quantinization step size.

4. A transcoder according to claim 1, wherein said inverse transformer is an inverse discrete cosine transformer and wherein said transformer is a discrete cosine transformer.

5. A transcoder according to claim 1, wherein said predictor is a motion compensator.

6. A transcoder according to claim 1, wherein said input former comprises:

an inverse quantizer for forming a quantized input signal, and a summer for generating an update signal representative of the sum of said feedback signal and said quantized input signal.

7. A transcoder according to claim 6, wherein said input former further comprises a selector for generating said corrected signal by selecting between said update signal and said quantized input signal.

8. A transcoder according to claim 7, wherein said input former further comprises a selector for generating said corrected signal by selecting between said update signal, said quantized input signal, and a skip block signal.

9. A transcoder according to claim 1, wherein said buffer includes a frame buffer for storing said quantinization error signal.

10. A transcoder according to claim 9, wherein said buffer further comprises a QP buffer operably coupled for receiving and buffering a step size signal, and a comparator operably coupled with said QP buffer, and said requantizer said comparator generating a switch control signal based upon a comparison between said step size signal and a buffered step size signal.

11. A transcoder according to claim 1, wherein said composite switch further comprises a first switch operably coupled with said buffer and said prediction processor, said first switch forming an intermediate signal by selecting between said delayed quantinization error signal and said prediction signal, and a second switch operably coupled with said first switch for selectively connecting said intermediate signal between a plurality of output paths.

12. A transcoder according to claim 1, further comprising a frequency weighted thresholder operably coupled with said input former, said thresholder generating a frequency weighted corrected signal.

13. A transcoder according to claim 12, wherein said frequency weighted thresholder applies frequency dependent threshold limits to said corrected signal.

14. A transcoder according to claim 1, further comprising a resource manager for monitoring the computational usage status of said transcoder and for controlling said transcoder in response thereto.

15. A transcoder according to claim 14, wherein said computation resource manager monitors an input buffer fullness.

16. A transcoder according to claim 14, wherein said computation resource manager controls said prediction processor to modify the computational usage of said transcoder.

17. A transcoder according to claim 14, wherein said computation resource manager controls said prediction processor to modify the computational usage of said transcoder.

18. A transcoder according to claim 14, wherein said computation resource manager controls said composite switch to modify the computational usage of said transcoder.

19. A transcoder according to claim 14, wherein said computation resource manager is operably coupled with a remote encoder and wherein said computation resource manager controls the coding mode of said remote encoder.

20. A transcoder according to claim 19 further comprising a counter, wherein said computation resource manager generates an intra refresh request signal for controlling said remote encoder when said counter exceeds a predetermined threshold.

21. A transcoder according to claim 20, wherein said counter counts the number of macroblocks affected by computational overload.

22. A method for transcoding an applied digitally encoded input signal and generating an output signal, said method comprising the successive steps of:

generating a corrected signal as a function of said input signal and a feedback signal, quantizing said corrected signal based upon a predetermined quantization step size to from said output signal, determining a quantization error signal based upon said output signal and said corrected signal, buffering said quantization error signal and generating a delayed quantization error signal, forming a prediction signal as a function of said delayed quantization error signal, and determining a feedback signal by selecting between said delayed quantization error signal and said prediction signal, wherein said step of forming a prediction signal includes generating a spatial signal by inverse linearly transforming said delayed quantization error signal, generating a spatial prediction signal by compensating said transformed signal with a motion vector, and generating said prediction signal by linearly transforming said spatially corrected signal.

23. A method according to claim 22, further comprising the step of identifying the coding mode of said input signal.

24. A method according to claim 23, wherein said step of generating said corrected signal further comprises selectively forming said corrected signal depending upon said identified coding mode.

25. A method according to claim 24, further comprising the steps of:

generating an update signal by summing said feedback signal and said input signal, and forming said corrected signal as a function of said update signal when said identified coding mode is inter mode.

26. A method according to claim 24, further comprising the step of forming said corrected signal as a function of a quantized input signal when said identified coding mode is intra mode.

27. A method according to claim 26, further comprising the steps of:

forming a skip block signal, and determining said corrected signal as a function of a skip block signal when said identified coding mode is skipped block mode.

28. A method according to claim 27, wherein said step of generating said skip block signal further comprises the steps of:

generating a step size signal identifying the current quantinization step size, forming a switch control signal as a function of said generated step size signal, said switch control signal directing the formation of said skip block signal.

29. A method according to claim 22, wherein said step of quantizing said corrected signal further includes weighting said corrected signal with frequency dependent threshold limits.

30. A method according to claim 22, further comprising the steps of monitoring and controlling a computational usage status.

31. A method according to claim 30, further comprising the steps of:

incrementing a state variable as said computational usage status rises above a predetermined level, and reducing said state variable as said computational usage status falls below said predetermined level.

32. A method according to claim 31, wherein said step of controlling said computational usage status further comprises selecting a signal path for generating said corrected signal as a function of said state variable.

33. A method according to claim 31, wherein said step of controlling said computational usage status further comprises selecting a signal path for generating said feedback signal as a function of said state variable.

34. A method according to claim 31, wherein said step of controlling said computational usage status further comprises generating a computational control signal as a function of said state variable, said computational control signal controlling at least one element selected from the group consisting of an input former, a composite switch, a buffer, and a prediction processor.

35. A method according to claim 30, wherein said controlling step further includes controlling the coding mode of a remote encoder.

36. A method according to claim 35, further including the step of generating an intra refresh request signal for controlling said remote encoder when said counter exceeds a predetermined threshold.

37. A method according to claim 36, further including the step of counting the number of macroblocks affected by computational overload.

* * * * *